United States Patent [19]

Eppig et al.

[11] Patent Number: 4,885,079
[45] Date of Patent: Dec. 5, 1989

[54] PROCESS FOR SEPARATING ORGANIC MATERIAL FROM PARTICULATE SOLIDS

[75] Inventors: Christopher P. Eppig, Cleveland Hts.; Stephen C. Paspek, North Royalton; Richard B. Stalzer, Broadview Hts., all of Ohio

[73] Assignee: The Standard Oil Company, Cleveland, Ohio

[21] Appl. No.: 320,865

[22] Filed: Mar. 7, 1989

Related U.S. Application Data

[63] Continuation of Ser. No. 906,727, Sep. 12, 1986, abandoned.

[51] Int. Cl.$^4$ .............................................. C10G 21/02
[52] U.S. Cl. ...................................... 208/13; 208/177; 208/179; 208/314; 208/337; 210/806
[58] Field of Search ............... 208/186, 309, 177, 180, 208/181, 187, 188, 314, 337, 13; 210/806

[56] References Cited

U.S. PATENT DOCUMENTS

| | | | |
|---|---|---|---|
| Re. 31,913 | 6/1985 | Berger | 196/14.52 |
| 2,037,218 | 4/1936 | Empson | 210/48 |
| 2,235,639 | 3/1941 | Koch | 196/5 |
| 2,383,362 | 8/1945 | Batchelder | 196/5 |
| 2,454,653 | 11/1948 | Kamp | 210/55 |
| 3,184,401 | 5/1965 | Gorin | 208/424 |
| 3,202,605 | 8/1965 | Redcay | 208/337 |
| 3,417,014 | 12/1968 | Lumpkin | 208/187 |
| 3,441,499 | 4/1969 | Francis et al. | 208/187 |
| 3,506,564 | 4/1970 | Cone | 196/14.52 |
| 3,696,021 | 10/1942 | Cole et al. | 208/13 |
| 3,711,400 | 1/1973 | Cole et al. | 210/21 |
| 3,789,077 | 1/1974 | Kosseim et al. | 260/674 SE |
| 3,997,425 | 12/1976 | Gatsis et al. | 208/424 |
| 4,017,383 | 4/1977 | Beavon | 208/309 |
| 4,025,424 | 5/1977 | Reichhardt et al. | 210/23 R |
| 4,035,281 | 7/1977 | Espensched et al. | 208/424 |
| 4,040,958 | 8/1977 | Rammler | 210/73 R |
| 4,073,719 | 2/1978 | Whisman et al. | 208/180 |
| 4,075,080 | 2/1978 | Gorin | 208/424 |
| 4,079,004 | 3/1978 | Tan et al. | 208/424 |
| 4,079,005 | 3/1978 | Tan et al. | 208/424 |
| 4,081,360 | 3/1978 | Bauer | 208/424 |
| 4,094,781 | 6/1978 | Snell et al. | 208/424 |
| 4,124,486 | 11/1978 | Nolley, Jr. | 208/95 |
| 4,211,638 | 7/1980 | Akell et al. | 208/180 |
| 4,224,136 | 9/1980 | zu Köcker et al. | 196/14.52 |

(List continued on next page.)

FOREIGN PATENT DOCUMENTS

| | | |
|---|---|---|
| 3345563A | 1/1985 | Fed. Rep. of Germany . |
| 3404133A | 8/1985 | Fed. Rep. of Germany . |
| 1364942 | 8/1974 | United Kingdom . |
| 1373023 | 11/1974 | United Kingdom . |
| 2001670 | 2/1979 | United Kingdom . |
| 2033244 | 5/1980 | United Kingdom ............. 196/14.52 |

OTHER PUBLICATIONS

Kingsley, G. S., "Pilot Plant Evaluation of Critical Fluid Extractions for Environmental Applications", Critical Fluid Systems, Inc., EPA Contract No. 68-0-2-3924, EPA/600/2-85/081, Jul. 1985.

Primary Examiner—Anthony McFarlane
Attorney, Agent, or Firm—Larry W. Evans; Joseph G. Curatolo; Teresan W. Gilbert

[57] ABSTRACT

A process is disclosed for separating an organic material from a composition comprising said organic material intermixed with particulate solids, the process comprising advancing a light hydrocarbon fluid through said particulate solids at an effective rate to drive said organic material from said particulate solids. In applications wherein the product produced by said process comprises said particulate solids and undesirable residual organic material intermixed with said particulate solids, said process further comprises the steps of: advancing a higher molecular weight hydrocarbon fluid through said particulate solids at an effective rate to drive said undesirable residual organic material from said particulate solids, at least part of said higher molecular weight hydrocarbon fluid remaining intermixed with said particulate solids; and advancing a second light hydrocarbon fluid through said particulate solids at an effective rate to drive remaining higher molecular weight hydrocarbon fluid from said particulate solids.

57 Claims, 3 Drawing Sheets

U.S. PATENT DOCUMENTS

| | | | |
|---|---|---|---|
| 4,260,473 | 4/1981 | Tan et al. | 585/240 |
| 4,260,489 | 4/1981 | Greig et al. | 210/771 |
| 4,267,061 | 5/1981 | Simo et al. | 210/772 |
| 4,273,644 | 6/1981 | Harris et al. | 208/321 |
| 4,311,561 | 1/1982 | Hastings | 196/14.52 |
| 4,335,001 | 6/1982 | Yves et al. | 210/708 |
| 4,341,619 | 7/1982 | Poska | 208/11 |
| 4,354,928 | 10/1982 | Audeh et al. | 208/309 |
| 4,374,015 | 2/1983 | Brule | 208/417 |
| 4,415,442 | 11/1983 | Rhodes | 208/424 |
| 4,416,764 | 11/1983 | Gikis et al. | 196/14.52 |
| 4,434,028 | 2/1984 | Eppiy et al. | 196/14.52 |
| 4,444,654 | 4/1984 | Cargle et al. | 208/188 |
| 4,450,067 | 5/1984 | Angevine et al. | 208/86 |
| 4,476,012 | 11/1984 | Gatsis | 208/424 |
| 4,502,944 | 3/1985 | Nelson | 208/45 |
| 4,517,099 | 5/1985 | Breckner et al. | 210/741 |
| 4,536,283 | 8/1985 | Davis | 208/309 |
| 4,568,447 | 2/1986 | Pujado et al. | 208/177 |
| 4,572,777 | 2/1986 | Peel | 208/424 |
| 4,634,520 | 1/1987 | Angelov et al. | 208/309 |
| 4,664,788 | 5/1987 | Gir et al. | 208/424 |
| 4,675,101 | 6/1987 | Warzinski | 208/314 |
| 4,686,048 | 8/1987 | Atherton et al. | 210/771 |
| 4,741,840 | 5/1988 | Atherton et al. | 210/771 |

PROCESS FOR SEPARATING ORGANIC MATERIAL FROM PARTICULATE SOLIDS

This is a continuation of co-pending application Ser. No. 906,727 filed on Sept. 12, 1986, now abandoned.

TECHNICAL FIELD

This invention relates to a process for separating an organic material from a composition comprising said organic material intermixed with particulate solids. This invention is particularly suitable for separating hydrocarbons from solid wastes and hazardous wastes (e.g., petroleum waste, refinery sludge, and the like). It is also suitable for treating catalyst fines-containing streams (e.g., decanter oil streams from fluid catalytic cracking units), oil-contaminated drill cuttings, steel mill scale, bleaching clay and the like.

BACKGROUND OF THE INVENTION

Refinery sludges are typically mixtures of hydrocarbon oils, heavy residual hydrocarbons including asphaltenes, water and particulate solids. These sludges are produced from a number of refinery units, including various standard waste water treatment separators. These sludges often contain substances such as benzene, toluene, xylene, chrysene and the like which are "listed" by the Environmental Protection Agency (EPA) as hazardous substances.

Historically, refinery sludges have been economically disposed of by land-filling and land-farming techniques. However, land disposal is now regulated by the Resource Conservation and Recovery Act (RCRA) and the Hazardous and Solid Waste Amendments of 1984 (RITA), and has consequently become more difficult and expensive.

U.S. Pat. No. 4,341,619 discloses a process for recovering carbonaceous materials from tar sands by supercritical extraction involving countercurrent flow of the tar sand and a solvent. The solvents that are disclosed as being useful include aromatic hydrocarbons, alicyclic hydrocarbons having 5-16 carbon atoms, phenols, and nitrogen-containing compounds. This patent is incorporated herein by reference.

U.S. Pat. No. 4,434,028 discloses a method and apparatus for removing oil and other organic constituents from particulate, inorganic-rich mineral solids. The reference indicates that the disclosed method and apparatus are particularly suitable for removing oil from oil-contaminated drill cuttings. This patent is incorporated herein by reference.

The final report for EPA Contract No. 68-02-3924 which is entitled "Pilot Plant Evaluation of Critical Fluid Extractions for Environmental Applications" discloses the results of using liquified-gas solvents in a pilot plant to extract oil from steel mill scale and bleaching clay. This report is incorporated herein by reference.

There is a need for an efficient, economical and reliable process for treating refinery sludges to render the product solids delistable or to facilitate additional handling and treatment of the solids, e.g., treatment by cementing to prevent metals leaching. It would be advantageous if this process were adaptable to treating other solid and hazardous wastes as well as other solids/hydrocarbon-containing materials such as catalyst fines-containing streams (e.g., decanter oil streams from fluid catalytic cracking units), oil-contaminated drill cuttings, steel mill scale, bleaching clay and the like.

SUMMARY OF THE INVENTION

This invention provides for a process for separating an organic material from a composition comprising said organic material intermixed with particulate solids, the process comprising advancing a light hydrocarbon fluid through said particulate solids at an effective rate to drive said organic material from said particulate solids. In applications wherein the product produced by said process comprises said particulate solids and undesirable residual organic material intermixed with said particulate solids, said process further comprises the steps of: advancing a higher molecular weight hydrocarbon fluid through said particulate solids at an effective rate to drive said undesirable residual organic material from said particulate solids, at least part of said higher molecular weight hydrocarbon fluid remaining intermixed with said particulate solids; and advancing a second light hydrocarbon fluid through said particulate solids at an effective rate to drive remaining higher molecular weight hydrocarbon fluid from said particulate solids.

DESCRIPTION OF THE PREFERRED EMBODIMENTS

The compositions that can be treated in accordance with the invention comprise an organic material intermixed with particulate solids. The organic material is typically in a liquid state at the pressure and temperature employed in the operation of the inventive process, although part of such organic material may be in a solid state at such pressure and temperature. These compositions also typically include water intermixed with the organic material and particulate solids.

The compositions that can be treated include solid waste and/or hazardous waste, including petroleum waste and refinery sludge. The term "solid waste" refers to any garbage, sludge or other waste material not excluded by EPA definitions. The term "hazardous waste" refers to solid waste or combinations of solid waste which are "listed" by the EPA as hazardous, or which exhibit ignitability, corrosivity or reactivity, or are considered toxic pursuant to relevant governmental rules or regulations. The term "petroleum waste" refers to any waste material containing petroleum or hydrocarbon oil intermixed with particulate solids and, in many instances, water. The term "refinery sludge" refers to sludges generated in petroleum refinery operations that contain petroleum or hydrocarbon oils intermixed with particulate solids; these sludges also contain water and the hydrocarbon oils in these sludges usually contain heavy residual hydrocarbons including asphaltenes.

The compositions that can be treated also include oil-contaminated catalyst fines (a refinery by-product), oil-contaminated drill cuttings (an oil well drilling by-product), oil-contaminated mill scale (a steel mill by-product), oil-contaminated bleaching clay (a vegetable oil filtering media), and the like. A specific example of the oil-contaminated catalyst fines that can be treated are the fines in decanter oil streams from fluid catalytic cracking units.

Preferably, the compositions that are treated are refinery sludges. A typical refinery sludge contains from about 1 to about 15% by weight hydrocarbon oil, from about 75 to about 98% by weight water, and from about 1 to about 15% by weight solids.

Throughout the remainder of this specification, the inventive process will be discussed in terms of treating refinery sludge, but it is to be understood that the principles and features discussed herein are equally applicable with respect to the treatment of any composition comprising an organic material intermixed with particulate solids.

The light hydrocarbon fluids that are useful with the inventive process are preferably selected from those fluids that do not readily form emulsions with water or hydrocarbon oil. These fluids are preferably capable of selectively removing large fractions of hydrocarbon oil from the sludge to be treated while not removing significant amounts of any water that may be present in such sludge. The light hydrocarbon fluids preferably have sufficiently low viscosities so that at economical flow rates unmanageable pressure drops are not experienced when the solids to be treated are in the form of a fixed bed, or excessive entrainments are not experienced when such solids are in the form of an agitated or fluidized bed. The fluid is preferably economically recoverable from the treated solids product once the inventive process has been completed. Preferred light hydrocarbon fluids include aliphatic and cycloaliphatic hydrocarbons having from 2 to about 9 carbon atoms, preferably from 2 to about 4 carbon atoms. Examples of such preferred fluids include propane, cyclopropane, propylene, butane, isobutane, cyclobutane, the butenes (e.g., butene-1, cis-butene-2, trans-butene-2), the butadienes (e.g., 1,3-butadiene), isobutylene and liquified petroleum gas (LPG). Examples of commercial grades of LPG that are useful include Commercial Propane, Commercial Butane, Commercial Propane-Butane Mixtures, Special Duty Propane and Propane HD-5, the specifications for which can be found in "Liquified Petroleum Gas Specifications and Test Methods", The Gas Processors Association, Tulsa, Okla., GPA Publication 2140-75, and ASTM Standard D1835-82; these references being incorporated herein by reference. Mixtures of two or more of the foregoing fluids can be used. Propane and commercial grades of LPG (e.g., Commercial Propane and Commercial Propane-Butane Mixtures) are particularly preferred.

In the inventive process, the light hydrocarbon fluid is advanced through the sludge being treated at an effective rate to drive the hydrocarbon oil in such sludge from the particulate solids. In some applications, depending on the particular sludge being treated and the desired level of treatment, undesirable residual organic material may remain intermixed with the particulate solids after treatment with the light hydrocarbon fluid. These undesirable residual organic materials typically comprise hydrocarbons having lower relative mutual solubilities, lower mutual diffusivities and/or higher viscosities than the light hydrocarbon fluid. These undesirable residual organic materials also include hydrocarbons that are in a solid state at the operating temperature and pressure of the process. Examples of these undesirable residual organic materials include heaving residual hydrocarbons including asphaltenes, condensed ring aromatics, resins, complex mixtures of high-boiling hydrocarbons (e.g., hydrocarbons having boiling points in excess of about 450° F. and an average of about 15 carbon atoms or more per molecule), and the like. These undesirable residual organic materials can be separated from the solids by advancing a higher molecular weight hydrocarbon fluid through the particulate solids at an effective rate to drive the undesirable residual organic material from the particulate solids.

The higher molecular weight hydrocarbon fluids are preferably selected from those hydrocarbon fluids which: can be facilitatingly separated from the initially used light hydrocarbon fluid using conventional techniques; dissolve heavy residual hydrocarbons including asphaltenes at modest temperatures (e.g., in the range of about 30° to about 400° F., preferably about 200° F.) and at moderate pressures (e.g., below about 500 psig); and can be separated from such water and heavy residual hydrocarbons using conventional separation techniques. These higher molecular weight hydrocarbon fluids are preferably aromatic compounds such as, for example, benzene, toluene, xylene (i.e., o-xylene, m-xylene, p-xylene) or a mixture of two or more of such aromatic compounds. In a particularly preferred embodiment, the higher molecular weight hydrocarbon fluid is preferably an aromatic or aromatic-enriched fluid that is readily available from a refinery system such as, for example, one or more of the reformate fluids (e.g., light reformate, heavy reformate, etc.) that are produced by reformers in a typical refinery system. A typical light reformate fluid has an initial boiling point of about 70° F., a final boiling point of about 245° F., a benzene content of about 13% by weight and a toluene content of about 34% by weight. A typical heavy reformate fluid has an initial boiling point of about 230° F., a final boiling point of about 375° F., and contains toluene, ethylbenzene, o-xylene and p-xylene.

In those applications wherein the higher molecular weight hydrocarbon fluid is used, it is generally also necessary to further treat the particulate solids with a second light hydrocarbon fluid to separate any higher molecular weight hydrocarbon fluid that may remain intermixed with the particulate solids. The second light hydrocarbon fluid can be the same light hydrocarbon fluid that is used initially, or it can be different. The second light hydrocarbon fluid preferably has the same characteristics as the initially used light hydrocarbon fluid. It should, however, be of sufficient purity so that any of such second light hydrocarbon fluid that should remain with the solids after treatment has been completed will not impart to such solids concentrations of EPA listed materials above those allowed by relevant EPA rules and regulations. Thus, preferred second light hydrocarbon fluids include aliphatic and cycloaliphatic hydrocarbons having from 2 to about 9 carbon atoms, preferably from 2 to about 4 carbon atoms. Examples of such preferred fluids include propane, cyclopropane, propylene, butane, isobutane, cyclobutane, the butenes (e.g., butene-1, cis-butene-2, trans-butene-2), the butadienes (e.g., 1,3-butadiene), isobutylene and LPG. Examples of commercial grades of LPG that are useful include Commercial Propane, Commercial Butane, Commercial Propane-Butane Mixtures, Special Duty Propane and Propane HD-5. Mixtures of two or more of the foregoing fluids can be used. Propane, and commercial grades of LPG (e.g., Commercial Propane and Commercial Propane-Butane Mixtures) are particularly preferred.

The sludge to be treated is preferably pretreated to remove some of the water and oil prior to treating the solids in accordance with the inventive process. In this pretreating step, raw sludge coming from various sources in the refinery system is advanced to one or more pretreatment units. The pretreatment units that are particularly useful include vacuum filters, belt presses, filter presses or a combination of the foregoing, the design of which are entirely conventional. An additional sludge dryer to further de-water the sludge can be used. The material coming off the pretreatment units are preferably placed in holding bins.

The sludge solids produced by the pretreatment units are conveyed to the contacting vessel. Conveyance to the contacting vessel can be by conveyor belt, screw conveyor, pneumatic equipment, in slurry form, in bags or baskets which are lowered into the contacting vessel, or by any other conventional means known in the art. A suitably designed gasketed filter press can serve as both the pretreatment unit and the contacting unit.

In an optional step, the pre-treated sludge solids can be mixed with one or more non-sludge materials to facilitate the formation of and/or insure the retention of a fluid-permeable mass or bed of sludge solids. The non-sludge materials that are useful are preferably selected from those materials having relatively low bulk densities when compared to the sludge solids and a structural integrity that does not degrade significantly when in contact with the hydrocarbon oils intermixed with the solids or the hydrocarbon fluids used in accordance with the inventive method. These non-sludge materials also preferably do not contain significant levels of EPA listed materials. Examples of the non-sludge materials that are useful include inorganic materials such as diatomaceous earth, vermiculite, pumice and the like; organic materials such as saw dust, wood chips, straw, ground tree bark, ground corn cobs, de-oiled rice bran, oil seeds and the like; and synthetic polymeric materials such as porous polypropylene beads, blown plastics (especially off-specification blown plastics) and the like. Polyelectrolyte polymer flocculating agents are also useful as the non-sludge material. Mixtures of two or more of the foregoing non-sludge materials can be used. The level of addition of non-sludge material to the sludge solids is typically in the range of zero to about 50% by volume, preferably about 5% to about 20% by volume of the non-sludge material based on the volume of the sludge solids. This optional step of mixing the sludge solids with a non-sludge material can be effected in the pre-treatment unit or in the contactor using conventional mixing techniques.

The contacting unit can be one or more pressurized vessels that may be operated in a batch mode, semi-batch mode or in a continuous mode. When multiple vessels are employed, the vessels can be operated in parallel or in staggered sequence. The configuration of the vessel is dependent upon the means of solids conveyance to and from the vessel. For example, if solids are conveyed to the vessel in slurry form, nozzles with ball valves or pinch valves can satisfactorily seal the vessel. If solids are conveyed by large bag or basket, large diameter hatch closures can be used to satisfactorily provide closure of the vessel. For pneumatic conveyance of the product solids from the vessels, conventional designs including cone-shaped bottoms with manifolds of air-jet nozzles can be used. Continuous systems employing lock-hoppers or rotary valves can be used. The product solids can also be conveyed from the contacting vessel by slurrying the solids with water followed by an appropriate de-watering step using, for example, vacuum drum filters, clarifiers, settling tanks, centrifuges, sludge dryers and the like. The solids can also be conveyed from the contacting vessel by slurrying them in liquid butane and then transferring the slurry to a low pressure lock hopper. The contacting vessels can employ mechanical agitators, and heating-/cooling jackets as well as external thermal insulation.

The direction of flow of the driving fluids (i.e., light hydrocarbon fluid, higher molecular weight hydrocarbon fluid, and second light hydrocarbon fluid) through the solids can be upwardly, downwardly or radially or it can alternate between any of the foregoing. While not wishing to be bound by theory, it is believed that the mechanism by which the driving fluids effect separation of the organic material from the solids involves (1) a sweeping action wherein the driving fluid advances through the mass or bed of particulate solids and displaces the organic material intermixed with such solids, and/or (2) an extraction wherein the organic material dissolves or disperses in the driving fluid and is carried away from the solids with such fluid. The term "drive" as used throughout the specification and in the appended claims refers to both of these mechanisms.

The contacting vessel effluent can be advanced directly to the appropriate refinery stream, or can be treated to separate oil in such effluent from the driving fluid. The oil is then advanced to the appropriate refinery stream and the driving fluid can be recycled. Separation can be accomplished by a number of means discussed in greater detail below including flashing and distillation.

One method for recycling the higher molecular weight hydrocarbon fluid employs a pump and a heater to pump the higher molecular weight hydrocarbon fluid through the contacting vessel until the desired bed temperature is reached. A heated storage tank is employed to store the contacting vessel fluid effluent. A continuous flash/distillation system separates the higher molecular weight hydrocarbon fluid from the undesirable residual organic materials. A cooler and separator are used to separate water from the higher molecular weight hydrocarbon fluid.

The contacting vessel is filled with solids conveyed from the pretreatment unit. These solids are intermixed with hydrocarbon oil and in most cases water. In applications wherein a slurry fill is used, the excess slurry solvent may be drained down. With other filling methods, an inert gas purge can be used. The contacting vessel is pressurized to the desired operating pressure, and condensed or partially condensed light hydrocarbon fluid is pumped into the contacting vessel and flows through the solids in said vessel. The temperature within the vessel is preferably in the range of about 32° F. to about 300° F., more preferably about 45° F. to about 220° F., more preferably about 60° F. to about 140° F. The pressure within the process is preferably in the range of about 50 to about 2000 psig, more preferably about 70 to about 1000 psig. The average contact time between the light hydrocarbon fluid and the solids is preferably in the range of about 5 minutes to about 24 hours, more preferably about 5 minutes to about 10 hours, and still more preferably about 5 minutes to about 5 hours. The light hydrocarbon fluid can be advanced through the particulate solids at a sufficient rate to expand the bed when the particulate solids are in the form of a fixed bed, or to fluidize the bed when the particulate solids are in the form of an agitated or fluidized bed. The temperature, pressure and flow rate of the light hydrocarbon fluid are set at levels so that preferably at least about 30% by weight, more preferably at least about 50% by weight, more preferably at least about 95% by weight of the fluid is in a condensed state. When in such a condensed state, the fluid should have a density in excess of about 15 pounds per cubic foot, preferably in excess of about 20 pounds per cubic foot, more preferably in excess of about 25 pounds per cubic foot. When the fluid is propane, the upper limit is preferably about 33 pounds per cubic foot. When the fluid is butane, the upper limit is preferably in the range of about 35 to about 40 pounds per cubic foot. The effluent from the contacting vessel preferably flows through a continuous on-line monitor, for example, an ultraviolet light absorption or ultraviolet light fluorescent detector which monitors the extent of removal of organic materials from the sludge.

If the second step employing the higher molecular weight hydrocarbon fluid is employed, the flow of the light hydrocarbon fluid into the contactor is stopped when the desired amount of hydrocarbon oil has been removed from the contactor and the light hydrocarbon fluid remaining in the vessel is removed from the vessel. The light hydrocarbon fluid can be removed by a number of conventional techniques including displacing the light hydrocarbon fluid with the higher molecular weight hydrocarbon fluid or an inert gas, or by draining the light hydrocarbon fluid from the contactor. The higher molecular weight hydrocarbon fluid is then introduced into the contactor and advanced through the solids in said contactor at an effective rate to drive the undesirable residual organic materials intermixed with said solids from said solids. The temperature within the contactor during this step of the process is preferably in the range of about 32° F. to about 400° F., more preferably about 100° F. to about 300° F., more preferably about 100° F. to about 250° F. The pressure within the contactor during this step of the process is preferably in the range of about atmospheric pressure to about 100 psig. The average contact time between the higher molecular weight hydrocarbon fluid and the solids is preferably in the range of about 5 minutes to about 24 hours, more preferably in the range of about 5 minutes to about 10 hours, and still more preferably in the range of about 5 minutes to about 5 hours. The higher molecular weight hydrocarbon fluid can be advanced through the particulate solids at a sufficient rate to expand the bed when the particulate solids are in the form of a fixed bed, or to fluidize the bed when the particulate solids are in the form of an agitated or fluidized bed. The temperature, pressure and flow rate of the higher molecular weight hydrocarbon fluid are set at levels so that preferably at least about 30% by weight, more preferably at least about 50% by weight, more preferably at least about 95% by weight of the fluid is in a condensed state.

At the completion of the second step of the process, the higher molecular weight hydrocarbon fluid is removed by displacing the higher molecular weight hydrocarbon fluid with the second light hydrocarbon fluid. The second light hydrocarbon fluid is advanced through the solids at a temperature that is preferably in the range of about 32° F. to about 300° F., more preferably about 45° F. to about 220° F., more preferably about 60° F. to about 140° F. The pressure within the contactor during this step of the process is preferably in the range of about 50 to about 2000 psig, more preferably about 70 to about 1000 psig. The average contact time between the second light hydrocarbon fluid and the solids is preferably in the range of about 5 minutes to about 24 hours, more preferably about 5 minutes to about 10 hours, and still more preferably in the range of about 5 minutes to about 5 hours. The second light hydrocarbon fluid can be advanced through the particulate solids at a sufficient rate to expand the bed when the particulate solids are in the form of a fixed bed, or to fluidize the bed when the particulate solids are in the form of an agitated or fluidized bed. The temperature, pressure and flow rate of the second light hydrocarbon fluid are set at levels so that preferably at least about 30% by weight, more preferably at least about 50% by weight, more preferably at least about 95% by weight of the fluid is in a condensed state. When in such a condensed state, the fluid should have a density in excess of about 15 pounds per cubic foot, preferably in excess of about 20 pounds per cubic foot, more preferably in excess of about 25 pounds per cubic foot. When the fluid is propane, the upper limit is preferably about 33 pounds per cubic foot. When the fluid is butane, the upper limit is preferably in the range of about 35 to about 40 pounds per cubic foot. The flow of the second light hydrocarbon fluid through the contactor is continued until a desired amount of the higher molecular weight hydrocarbon fluid is removed from the solids. Upon completion of the removal of the higher molecular weight hydrocarbon fluid, the second light hydrocarbon fluid is then removed. The second light hydrocarbon fluid can be removed using a number of conventional techniques including displacing the second light hydrocarbon fluid with an inert gas or by draining the second light hydrocarbon fluid from the contactor and then depressurizing the contactor. The solids are then removed from the contactor vessel using the techniques discussed above. The solids that are removed can be disposed of using conventional solids disposal techniques.

Figures 1, 2:
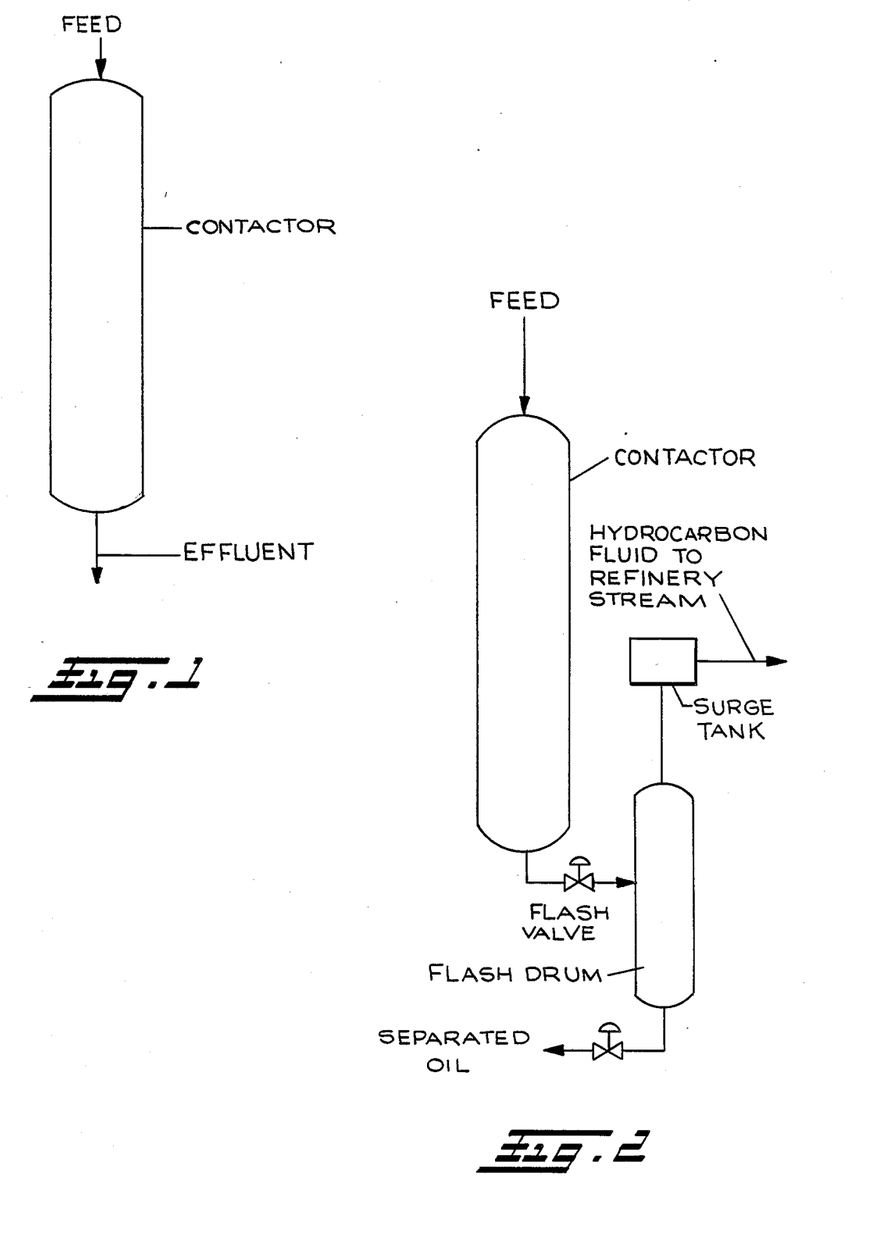
FIG. 1 is a flow sheet illustrating the process of the invention in a preferred form with the effluent from the contactor being returned directly to a refinery system.
FIG. 2 is a flow sheet illustrating the process of the invention in another preferred form using flashing to separate the light hydrocarbon fluid in the effluent from the contactor from the oil in such effluent.

In order to further illustrate the inventive process, reference is made to the drawings and initially to FIG. 1. FIG. 1 is a flow sheet illustrating the inventive process wherein the effluent stream from the contactor is returned directly to the refinery system. The sludge to be treated is preferably pretreated as discussed above and the resulting partially de-oiled and de-watered solids are placed in the contactor vessel. The light hydrocarbon fluid is introduced into the contactor vessel and advanced downwardly through the solids in the contactor vessel. The downward flow of the light hydrocarbon fluid through the solids in the contactor vessel drives the hydrocarbon oil that is intermixed with the solids downwardly through the contactor vessel to and through an outlet in the bottom of the contactor vessel. The effluent from the contactor, which comprises a mixture of separated hydrocarbon oil and light hydrocarbon fluid, is then returned to an appropriate location in the refinery system (e.g., the crude tower) for further processing. Most of the water that is intermixed with the solids remains behind with the solids. Upon completion of the removal of hydrocarbon from the solids, the solids are removed from the contactor and are disposed of using conventional solids disposal techniques (e.g., landfill, etc.).

FIG. 2 is a flow sheet illustrating the operation of the inventive process using a contactor vessel, flash valve, flash drum and surge tank. The sludge to be treated is preferably pretreated as discussed above and the resulting partially de-oiled and de-watered solids are placed in the contactor vessel. The contactor vessel is pressurized to the desired operating pressure by introducing the light hydrocarbon fluid into the contactor vessel and adjusting the flow rates through the compressor and the flash valve. Light hydrocarbon fluid is advanced downwardly through the solids in the contactor vessel. The downward flow of light hydrocarbon fluid drives the oil that is intermixed with the solids downwardly through the contactor vessel to and through an opening in the bottom of the contactor vessel and through a conduit to the flash valve. The effluent stream that is advanced to the flash valve comprises a mixture of hydrocarbon oil and the light hydrocarbon fluid. The flash valve is opened to permit the flow of the effluent stream to the flash drum. Most of the water that is intermixed with the solids remains behind in the contactor vessel with the solids. In the flash drum the light hydrocarbon fluid flashes and separates from the oil. The separated oil is removed from flash drum and advanced to the refinery system for further processing. Light hydrocarbon fluid is advanced to the surge tank where it is collected and then returned to an appropriate location in the refinery system (e.g., refinery fuel gas system). Upon completion of the desired separation of the hydrocarbon oil from the solids, the process is discontinued and the solids are removed from the contactor vessel and disposed of using conventional solids disposal techniques.

Figure 3:
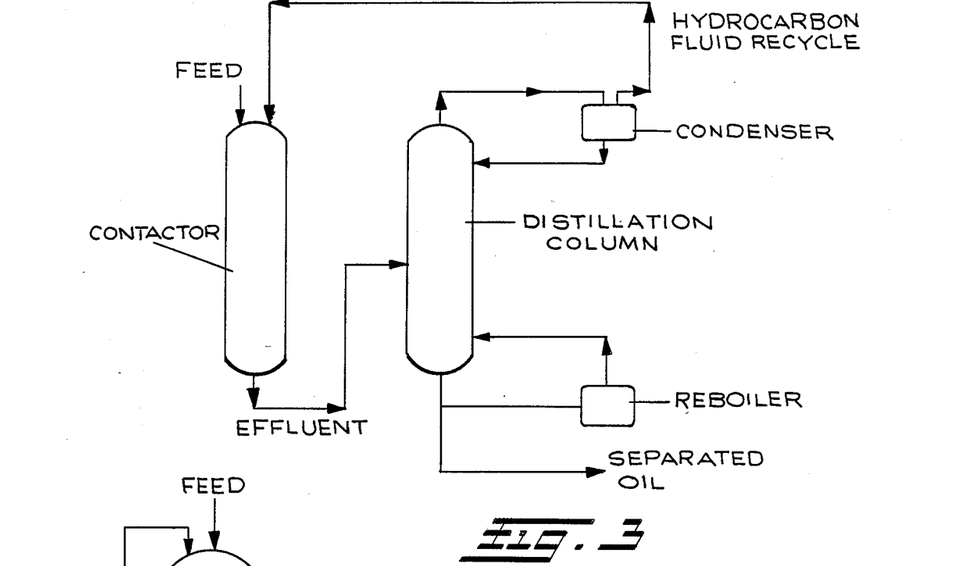
FIG. 3 is a flow sheet illustrating the process of the invention in another preferred form using distillation to separate the light hydrocarbon fluid in the effluent from the contactor from the oil in such effluent.

FIG. 3 is a flow sheet illustrating the operation of the inventive process using a contactor and a distillation column. The sludge to be treated is preferably pretreated as discussed above and the resulting partially de-oiled and de-watered solids are placed in the contactor vessel. The light hydrocarbon fluid is advanced downwardly through the contactor vessel. The downward flow of light hydrocarbon fluid through the solids drives the hydrocarbon oil that is intermixed with the solids downwardly through the contactor vessel to and through an opening in the bottom of the contactor vessel and then through a conduit to the distillation colurnn. The effluent stream that is advanced to the distillation column comprises a mixture of the separated hydrocarbon oil and the light hydrocarbon fluid. The hydrocarbon oil and light hydrocarbon fluid are separated in the distillation column using conventional distillation techniques. The light hydrocarbon fluid that emerges from the distillation column is recycled to the contactor. The separated oil that emerges from the distillation column is advanced to the refinery system for further processing. Upon completion of the desired separation of the hydrocarbon oil from the solids, the process is discontinued and the solids are removed from the contactor vessel and disposed of using conventional solids disposal techniques.

Figure 4:
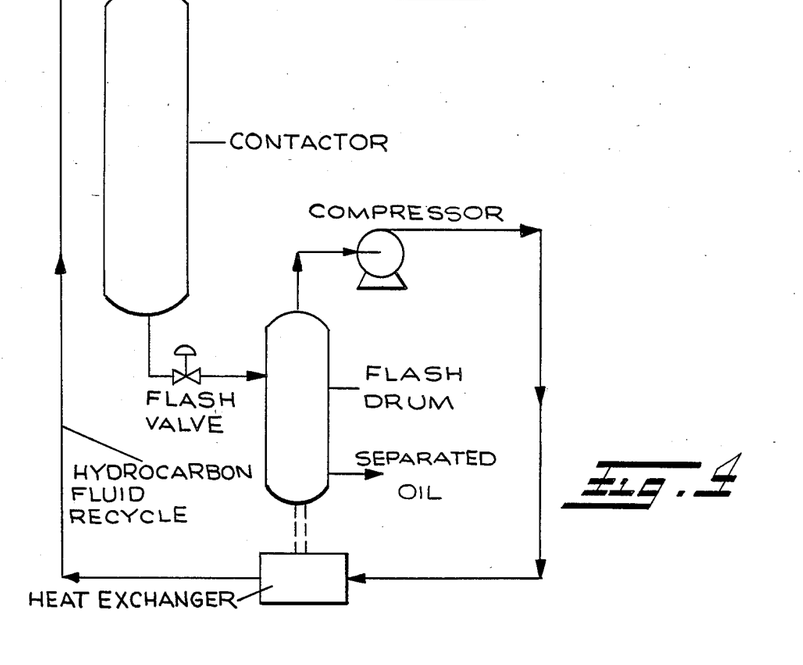
FIG. 4 is a flow sheet illustrating the process of the invention in another preferred form using flashing and vapor compression to separate the light hydrocarbon fluid in the effluent from the contactor from the oil in such effluent and to then recycle the light hydrocarbon fluid.

FIG. 4 is a flow sheet illustrating the operation of the inventive process using a contactor vessel, flash drum, compressor and heat exchanger. The sludge to be treated is preferably pretreated as discussed above and the resulting partially de-oiled and de-watered solids are placed in the contactor vessel. The contactor vessel is pressurized to the desired operating pressure by introducing the light hydrocarbon fluid into the contactor vessel and adjusting the flow rates through the compressor and the flash valve. Light hydrocarbon fluid is advanced downwardly through the solids in the contactor vessel. The downward flow of light hydrocarbon fluid drives the hydrocarbon oil that is intermixed with the solids downwardly through the contactor vessel to and through an opening in the bottom of the contactor vessel and then through a conduit to the flash valve. The effluent stream that is advanced to the flash valve comprises a mixture of hydrocarbon oil and the light hydrocarbon fluid. The flash valve is opened to permit the flow of the effluent to the flash drum. Most of the water that is intermixed with the solids remains behind in the contactor vessel with the solids. In the flash drum, the light hydrocarbon fluid flashes and separates from the hydrocarbon oil. The separated hydrocarbon oil is removed from the flash drum and advanced to the refinery system for further processing. The light hydrocarbon fluid vaporizes in the flash drum, and is advanced through a conduit to the compressor wherein it is compressed. The compressed fluid is advanced to and through the heat exchanger and then back to the contactor. In the heat exchanger, heat is transferred from the light hydrocarbon fluid to the flash drum. Upon completion of the desired separation of oil from the solids, the process is discontinued and the solids are removed from the contactor vessel and disposed of using conventional solids disposal techniques.

Figure 5:
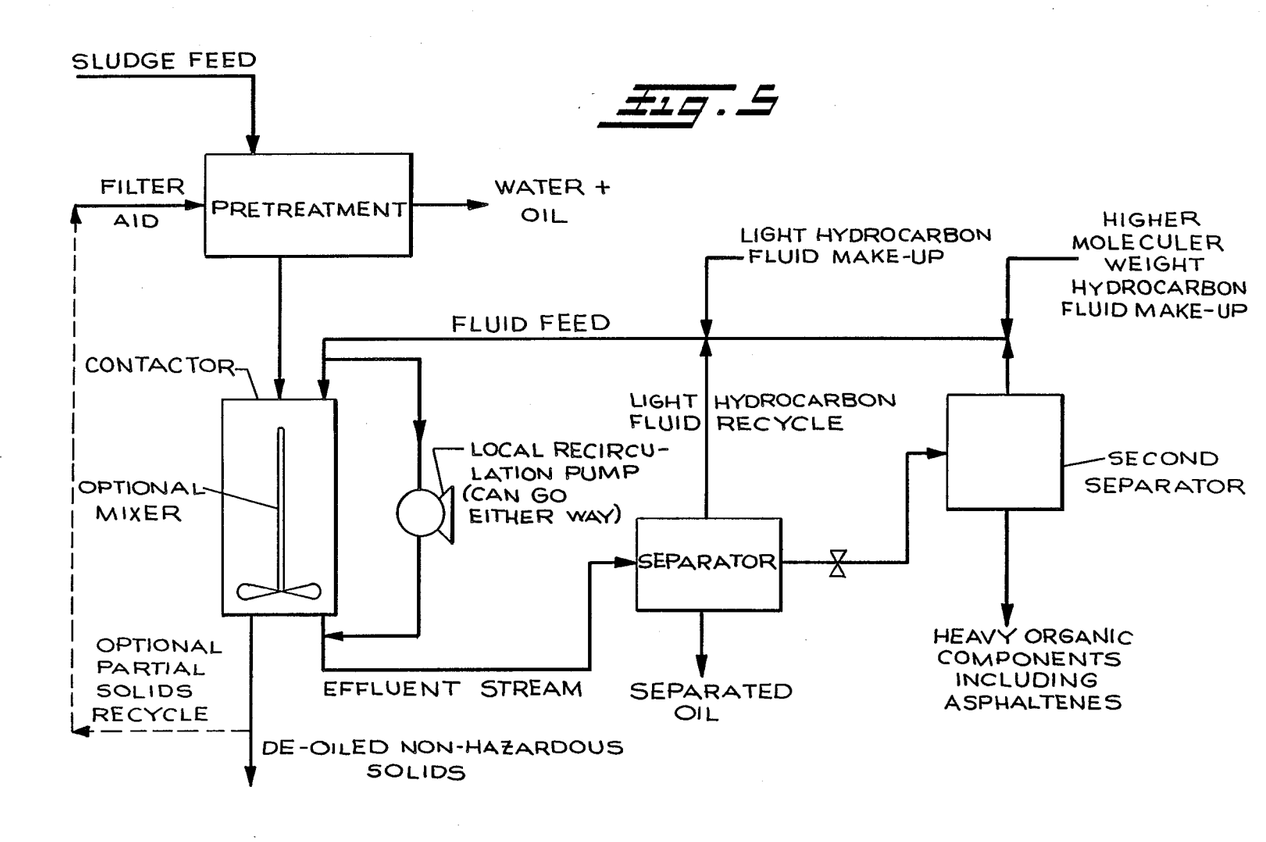
FIG. 5 is a flow sheet illustrating the process of the invention in another preferred form wherein the sludge to be treated is initially contacted with a light hydrocarbon fluid and then subsequently contacted with a higher molecular weight hydrocarbon fluid and second light hydrocarbon fluid.

FIG. 5 is a process flow sheet illustrating the inventive process wherein the sludge to be treated is initially contacted with the light hydrocarbon fluid and then subsequently contacted with the higher molecular weight hydrocarbon fluid and second light hydrocarbon fluid. In this embodiment of the inventive process, there is employed a pretreatment unit, contactor, separator and second separator. The sludge to be treated is advanced to the pretreatment unit wherein water and oil are partially removed. A conventional filter aid is preferably used to enhance the separation. From the pretreatment unit, partially de-watered and de-oiled solids are advanced to the contactor. In the contactor, the solids are initially contacted with the light hydrocarbon fluid under the conditions of temperature, pressure and flow rate discussed above. An agitator is provided in the contactor for mixing purposes; mixing is optional and used to prevent the formation of undesirable channels and the like in the solids bed. The effluent stream emmerging from the contactor contains hydrocarbon oil and light hydrocarbon fluid. Most of the water that is intermixed with the solids remains in the contactor. The effluent stream is advanced to the first separator wherein the light hydrocarbon fluid and hydrocarbon oil are separated using conventional techniques. Separation can be effected, for example, by flashing the light hydrocarbon fluid in a flash tank. The separated oil is advanced to the refinery system for further processing. The light hydrocarbon fluid is recirculated to the contactor. Once the desired level of removal of hydrocarbon oil is achieved using the light hydrocarbon fluid, undesirable residual organic materials (e.g., heavy residual hydrocarbons containing asphaltenes) may remain intermixed with the solids in the contactor. These undesirable residual organic materials can be removed by advancing the higher molecular weight hydrocarbon fluid through the contactor under the conditions of temperature, pressure and flow rate discussed above. The effluent stream from the contactor during this step of the process contains a mixture of hydrocarbon oil, undesirable residual organic materials and the higher molecular weight hydrocarbon fluid. This effluent stream is advanced to the separator wherein hydrocarbon oil is separated using conventional techniques. The remaining mixture of higher molecular weight hydrocarbon fluid and undesirable residual organic materials is advanced to the second separator to separate out the undesirable residual organic materials. This separation can be effected using conventional techniques (e.g., distillation). Once the undesirable residual organic materials are removed from the solids in the contactor, a second light hydrocarbon fluid is advanced through the contactor under the conditions of pressure, temperature and flow rate discussed above to drive any residual higher molecular weight hydrocarbon fluid that may have remained intermixed with the solids in the contactor from such solids. Upon completion of this step of the process, the second light hydrocarbon fluid is preferably removed by any of a number of conventional techniques including displacing the second light hydrocarbon fluid with an inert gas or by draining the second light hydrocarbon fluid from the contactor. The process also provides for a local fluid pump-around that can be optionally used prior to any of the fluid/solids contacting steps of the process, and/or recycling of the solids to increase the degree of separation of hydrocarbon oil from the solids. Upon completion of the inventive process, the solids are removed from the contactor and disposed of using conventional solids disposal techniques.

The following examples are illustrative of the process of the present invention. Unless otherwise indicated, in the following examples as well as throughout the entire specification and in the appended claims, all parts and percentages are by weight, and all temperatures are in degrees Fahrenheit.

In the following examples the apparatus that was used included a reservoir for liquified propane which was connected via a conduit to a pump system consisting of a pump, reservoir and back pressure regulator. A conduit from the reservoir extended to a conduit manifold for connecting the propane conduit to either the top or the bottom of the contactor vessels. A pressure transducer was positioned in the propane conduit downstream of the reservoir but upstream from the manifold. A metering pump fed an aromatics-enriched fluid to the propane conduit downstream of the pressure transducer, but upstream of the manifold. One of two stainless steel contactor vessels were used. Contactor vessel No. 1 had an internal diameter of 1.5 inches and a length of 13 inches. Contactor vessel No. 2 had an internal diameter of 3.75 inches and a length of 14 inches. Each of the contactors were equipped with an internal thermocouple. A temperature control system was mounted around the contactor vessels. A conduit extended from these contactor vessels to a flash vessel separator. A back pressure regulator was positioned in this conduit. A flash valve was also located in this conduit downstream of the back pressure regulator. A heat exchanger was positioned in this conduit downstream of the flash valve but upstream of the flash vessel separator. A conduit extended from the flash vessel separator to an exhaust vent. A dry test meter was placed in this conduit downstream from the flash vessel separator to monitor gases leaving the flash vessel. The flash vessel separator had a drain in its bottom for removing liquids. An electronic timer was used to monitor flow rates.

The following procedure was used for each of the examples discussed below. A weighed amount of sludge feed material was loaded into one of the contactor vessels. The contactor vessel was sealed, connected to the test system and purged with an inert gas. The contactor temperature was adjusted to the desired level. Fluid flow rate was controlled by the flash valve. The flash valve effluent flowed through the heat exchanger and liquid products collected in the bottom of the flash vessel while vaporized gases flowed through the dry test meter. By monitoring the amount of liquid products as a function of fluid flow and time, the process kinetics were determined. Treated solids were emptied from the contactor vessel and analyzed. The following partially de-watered feed sludges were tested:

TABLE I

|  | Wt. % Hydrocarbon | Wt. % Water | Wt. % Solids |
| --- | --- | --- | --- |
| Vacuum Filter Cake A | 19 | 42 | 39 |
| Filter Press Cake B | 17 | 32 | 51 |
| Belt Press Cake C | 18 | 58 | 24 |

In each of these cases, the cakes were self-adhering, dark in color, and had a noxious odor.

EXAMPLE 1

1411 grams of vacuum filter cake A were charged to contactor vessel No. 2. 4200 grams of propane were advanced downwardly through the contactor over a period of 60 minutes. The temperature within the contactor was 80° F. The pressure was 145 psig. The propane was flashed from the effluent stream and 256 grams of oil were collected. No water was observed in the collected oil. The separated oil had an initial boiling point of 284° F., a final boiling point of 872° F., and 75% by weight of the oil had a boiling point below 700° F. The oil consisted of 40% saturates, 57% aromatics and 3% resin. A gas chromatograph examination of the oil indicated a complex mixture of hydrocarbons, including one peak occurring at the retention time of chrysene, in addition to other heavy aromatic peaks. The oil had an iron content of 10 ppm, and less than 0.8 ppm of nickel and vanadium. The product solids were lighter in color and more free-flowing than the feed sludge. The product solids contained about 1.2% by weight (based on the weight of the product solids) of a black, hexane insoluble, heavy organic, tar-like material.

EXAMPLE 2

135.72 grams of vacuum filter cake A were charged to contactor vessel No. 1 and contacted with 393.6 grams of propane over a period of 90 minutes. The temperature within the contactor was 73.4° F. and the pressure was 130 psig. The product solids contained about 1.2% by weight of organic material which could be extracted with toluene at 175°-230° F. The separated oil contained virtually no water. The product solids were lighter in color and more free-flowing than the feed material.

EXAMPLE 3

1408 grams of vacuum filter cake A were charged to contactor vessel No. 2 and contacted with 3414 grams of propane over a period of 90 minutes. The propane flow was downwardly through the contactor, the temperature was 86° F. and the pressure was 150 psig. The product solids contained about 1.2% by weight of an organic material which could be extracted with toluene at 175°-230° F. The separated oil contained virtually no water. The feed material as well as the product solids were analyzed for various organic including EPA listed hazardous materials, with the results being as follows:

| Compound | Feed, ppm | Product, ppm |
| --- | --- | --- |
| benzene | 62 | 0.036 |
| 1,2-dichloroethane | <2 | <0.035 |
| methyl ethyl ketone | <40 | <0.070 |
| ethyl benzene | 77 | <0.035 |
| toluene | 350 | 0.068 |
| xylene, m | 200 | <0.035 |
| xylenes, o, p | 170 | 0.180 |
| benzo(b)fluoranthene | <10 | <1.200 |
| chrysene | 52 | 2.400 |
| dibenz(a,h)anthracene | <10 | <1.200 |
| benzo(a)pyrene | <10 | <1.2 |
| fluoranthene | 32 | <1.2 |
| indene | <10 | <1.2 |
| 1-methylnaphthalene | 570 | 3.9 |
| naphthalene | 190 | 3.1 |
| phenanthrene | 420 | 7.0 |
| pyrene | 180 | 3.5 |
| quinoline | <100 | <1.2 |
| selenium | 0.150 | 0.036 |

EXAMPLE 4

2045 grams of filter press cake B were charged to contactor vessel No. 2 and contacted with 7094 grams of liquid propane over a period of 90 minutes. The temperature within the contactor was 80° F., and the pressure was 145 psig. The product solids were lighter in color and more free flowing than the feed material. The product solids contained about 2.4% by weight heavy residual hydrocarbons including asphaltene. The separated oil contained virtually no water.

EXAMPLE 5

113.0 grams of vacuum filter cake A were charged to contactor vessel No. 1 and contacted with 250 grams of liquid propane at a temperature of 73.4° F. and a pressure of 130 psig. The direction of flow of the propane was downward. The propane was then drained from the contactor, and the contactor was depressurized. The contactor vessel and solids were heated to a temperature of 185° F. 303 grams of toluene at a temperature of 185°-230° F. were advanced upwardly through the solids over a period of 90 minutes. The temperature of the solids and the effluent stream ranged from 185° to 230° F. The pressure of the system was maintained at 50 psig. The toluene extracted both heavy residual hydrocarbons including asphaltenes and water. The effluent stream was cooled to ambient temperature. A clear water phase separated from the organic phase. The contactor vessel was cooled and drained of toluene. 250 grams of liquid propane were advanced downwardly through the solids in the contactor vessel at a temperature of 73.4° F. to remove residual toluene. The pressure within the contactor vessel was 130 psig. The product solids contained less than 0.2% by weight heavy residual hydrocarbons including asphaltenes, and had a water content lower than the water content of the feed. The feed material as well as the product solids were analyzed for various organics including EPA listed hazardous materials, with the results being as follows:

| Compound | Feed, ppm | Product, ppm |
| --- | --- | --- |
| benzo(b)fluoranthene | <10 | <0.40 |
| chrysene | 52 | 0.36 |
| dibenz(a,h)anthracene | <10 | <0.20 |
| benzo(a)pyrene | <10 | 0.24 |
| fluoranthene | 32 | <0.20 |
| indene | <10 | <0.20 |
| 1-methylnaphthalene | 570 | 0.38 |
| naphthalene | 190 | 0.35 |
| phenanthrene | 420 | 0.42 |
| quinoline | <100 | <0.40 |

EXAMPLE 6

681 grams of belt press cake C were charged to contactor vessel No. 2 and contacted with 1799 grams of propane over a period of 90 minutes. The propane flow was downwardly through the contactor. The temperature within the contactor was 71° F. and the pressure was 125 psig. The propane was flashed from the effluent stream and 54 grams of separated oil were collected. 616 grams of solid were dried at a temperature of 221° F. to a 3% by weight moisture content and then contacted with 1436 grams of propane over a period of 90 minutes. The direction of flow of propane was downwardly through the contactor, the temperature was 77° F. and the pressure was 135 psig. The propane was flashed from the effluent stream and 88 grams of oil were collected in six sequential fractions. The final oil fraction was analyzed and found to have characteristics comparable to those of a Fluid Catalytic Cracker decant oil.

An advantage of this invention is that an efficient, economical and reliable process is provided for treating refinery sludges and the like to render the product solids from such process delistable and/or to facilitate additional handling and treatment of the solids, e.g., treatment by cementing to prevent metals leaching. An additional advantage is that this process is adaptable to treating other solid and hazardous wastes as well as other materials such as catalyst fines-containing streams (e.g., decanter oil streams from fluid catalytic cracking units), oil-contaminated drill cuttings, steel mill scale, bleaching clay and the like.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for separating hydrocarbon oil and heavy residual organics from a feed composition comprising solids intermixed with said hydrocarbon oil and heavy residual organics, said heavy residual organics having higher boiling points than said hydrocarbon oil, said process comprising the steps of:

(1) contacting said feed composition with a first hydrocarbon fluid of from 2 to about 9 carbon atoms for an effective period of time to extract at least part of said hydrocarbon oil from said feed composition and form a first separatable phase comprising said hydrocarbon oil and said first hydrocarbon fluid, and separating at least part of said first separatable phase from said feed composition to provide a first intermediate composition;

(2) contacting said first intermediate composition from step (1) with a second hydrocarbon fluid for an effective period of time to extract at least part of said heavy residual organics from said first intermediate composition and form a second separatable phase comprising said second hydrocarbon fluid and said heavy residual organics, said second hydrocarbon fluid being capable of dissolving at least part of said heavy residual organics at a temperature in the range of about 30° F. to about 400° F. and a pressure below about 500 psig, and separating at least part of said second separatable phase from said first intermediate composition to provide a second intermediate composition, at least part of said second hydrocarbon fluid remaining in said second intermediate composition; and (3) contacting said second intermediate composition from step (2) with a third hydrocarbon fluid of from 2 to about 9 carbon atoms for an effective period of time to extract at least part of said second hydrocarbon fluid from said second intermediate composition and form a third separatable phase comprising said third hydrocarbon fluid and said second hydrocarbon fluid, and separating at least part of said third separatable phase from said second intermediate composition to provide a treated product.

2. The process of claim 1 wherein said feed composition further comprises water.

3. The process of claim 1 wherein said feed composition comprises solid waste.

4. The process of claim 1 wherein said feed composition comprises hazardous waste.

5. The process of claim 1 wherein said feed composition comprises petroleum waste.

6. The process of claim 1 wherein said feed composition comprises refinery sludge.

7. The process of claim 1 wherein said first hydrocarbon fluid comprises an aliphatic or cycloaliphatic hydrocarbon of from 2 to about 9 carbon atoms.

8. The process of claim 1 wherein said first hydrocarbon fluid comprises an aliphatic or cycloaliphatic hydrocarbon of from 2 to about 4 carbon atoms.

9. The process of claim 1 wherein said first hydrocarbon fluid comprises propane, cyclopropane, propylene, butane, isobutane, cyclobutane, a butene, a butadiene, isobutylene, or a mixture of two or more thereof.

10. The process of claim 1 wherein said first hydrocarbon fluid comprises liquified petroleum gas.

11. The process of claim 1 wherein at least about 30% by weight of said first hydrocarbon fluid is in a condensed state during step (1).

12. The process of claim 1 wherein at least about 50% by weight of said first hydrocarbon fluid is in a condensed state during step (1).

13. The process of claim 1 wherein at least about 95% by weight of said first hydrocarbon fluid is in a condensed state during step (1).

14. The process of claim 1 wherein said first hydrocarbon fluid is maintained at a temperature in the range of about 32° F. to about 300° F. during step (1).

15. The process of claim 1 wherein said first hydrocarbon fluid is maintained at a temperature in the range of about 45° F. to about 220° F. during step (1).

16. The process of claim 1 wherein said first hydrocarbon fluid is maintained at a temperature in the range of about 60° F. to about 140° F. during step (1).

17. The process of claim 1 wherein said first hydrocarbon fluid is maintained at a pressure in the range of about 50 to about 2000 psig during step (1).

18. The process of claim 1 wherein said first hydrocarbon fluid is maintained at a pressure in the range of about 70 to about 1000 psig during step (1).

19. The process of claim 1 wherein the average contact time between said first hydrocarbon fluid and said feed composition during step (1) is from about 5 minutes to about 24 hours.

20. The process of claim 1 wherein the average contact time between said first hydrocarbon fluid and said feed composition during step (1) is from about 5 minutes to about 10 hours.

21. The process of claim 1 wherein the average contact time between said first hydrocarbon fluid and said feed composition during step (1) is from about 5 minutes to about 5 hours.

22. The process of claim 1 wherein said feed composition is in the form of a bed of particulate solids with said hydrocarbon oil and said heavy residual organics intermixed with said particulate solids, said first hydrocarbon fluid flowing through said bed at a sufficient rate to expand said bed.

23. The process of claim 1 wherein said feed composition is in the form of a bed of particulate solids with said hydrocarbon oil and said heavy residual organics intermixed with said particulate solids, said first hydrocarbon fluid flowing through said bed at a sufficient rate to fluidize said bed.

24. The process of claim 1 wherein said second hydrocarbon fluid comprises at least one aromatic compound.

25. The process of claim 1 wherein said second hydrocarbon fluid comprises benzene, toluene, xylene, or a mixture of two or more thereof.

26. The process of claim 1 wherein said third hydrocarbon fluid comprises an aliphatic or cycloaliphatic hydrocarbon of from 2 to about 9 carbon atoms.

27. The process of claim 1 wherein said third hydrocarbon fluid comprises an aliphatic or cycloaliphatic hydrocarbon of from 2 to about 4 carbon atoms.

28. The process of claim 1 wherein said third hydrocarbon fluid comprises propane, cyclopropane, propylene, butane, isobutane, cyclobutane, a butene, a butadiene, isobutylene, or a mixture of two or more thereof.

29. The process of claim 1 wherein said third hydrocarbon fluid comprises liquified petroleum gas.

30. The process of claim 1 wherein at least about 30% by weight of said third hydrocarbon fluid is in a condensed state during step (3).

31. The process of claim 1 wherein at least about 50% by weight of said third hydrocarbon fluid is in a condensed state during step (3).

32. The process of claim 1 wherein at least about 95% by weight of said third hydrocarbon fluid is in a condensed state during step (3).

33. The process of claim 1 wherein said second hydrocarbon fluid is maintained at a temperature in the range of about 32° F. to about 400° F. during step (2).

34. The process of claim 1 wherein said second hydrocarbon fluid is maintained at a temperature in the range of about 100° F. to about 300° F. during step (2).

35. The process of claim 1 wherein said second hydrocarbon fluid is maintained at a temperature in the range of about 100° F. to about 250° F. during step (2).

36. The process of claim 1 wherein said second hydrocarbon fluid is maintained at a pressure in the range of about atmospheric pressure to about 100 psig during step (2).

37. The process of claim 1 wherein the average contact time between said second hydrocarbon fluid and said first intermediate composition is from about 5 minutes to about 24 hours during step (2).

38. The process of claim 1 wherein the average contact time between said second hydrocarbon fluid and said first intermediate composition is from about 5 minutes to about 10 hours during step (2).

39. The process of claim 1 wherein the average contact time between said second hydrocarbon fluid and said first intermediate composition is from about 5 minutes to about 5 hours during step (2).

40. The process of claim 1 wherein said first hydrocarbon fluid and said third hydrocarbon fluid are the same.

41. The process of claim 1 wherein said first hydrocarbon fluid and said third hydrocarbon fluid each comprises propane.

42. The process of claim 1 wherein said third hydrocarbon fluid is maintained at a temperature in the range of about 32° F. to about 300° F. during step (3).

43. The process of claim 1 wherein said third hydrocarbon fluid is maintained at a temperature in the range of about 45° F. to about 220° F. during step (3).

44. The process of claim 1 wherein said third hydrocarbon fluid is maintained at a temperature in the range of about 60° F. to about 140° F. during step (3).

45. The process of claim 1 wherein said third hydrocarbon fluid is at a pressure in the range of about 50 to about 2000 psig during step (3).

46. The process of claim 1 wherein said third hydrocarbon fluid is at a pressure in the range of about 70 to about 1000 psig during step (3).

47. The process of claim 1 wherein the average contact time between said third hydrocarbon fluid and said second intermediate composition is from about 5 minutes to about 24 hours during step (3).

48. The process of claim 1 wherein the average contact time between said third hydrocarbon fluid and said second intermediate composition is from about 5 minutes to about 10 hours during step (3).

49. The process of claim 1 wherein the average contact time between said third hydrocarbon fluid and said second intermediate composition is from about 5 minutes to about 5 hours during step (3).

50. The process of claim 1 wherein at least about 30% by weight of said second hydrocarbon fluid is in a condensed state during step (2).

51. The process of claim 1 wherein at least about 50% by weight of said second hydrocarbon fluid is in a condensed state during step (2).

52. The process of claim 1 wherein at least about 95% by weight of said second hydrocarbon fluid is in a condensed state during step (2).

53. The process of claim 1 wherein said second hydrocarbon fluid is derived from an aromatics-rich refinery stream.

54. The process of claim 1 wherein said second hydrocarbon fluid comprises a reformate fluid.

55. The process of claim 1 wherein said feed composition is mixed with a non-sludge material prior to contacting said feed composition with said first hydrocarbon fluid.

56. A process for separating hydrocarbon oil and heavy residual organics from a feed composition comprising solids intermixed with said hydrocarbon oil and heavy residual organics, said heavy residual organics having higher boiling points than said hydrocarbon oil, said process comprising the steps of:
  (1) contacting said feed composition with a first hydrocarbon fluid of from 2 to about 4 carbon atoms for an effective period of time to extract at least part of said hydrocarbon oil from said feed composition and form a first separatable phase comprising said hydrocarbon oil and said first hydrocarbon fluid, and separating at least part of said first separatable phase from said feed composition to provide a first intermediate composition;
  (2) contacting said first intermediate composition from step (1) with a second hydrocarbon fluid comprising at least one aromatic compound for an effective period of time to extract at least part of said heavy residual organics from said first intermediate composition and form a second separatable phase comprising said second hydrocarbon fluid and said heavy residual organics, and separating at least part of said second separatable phase from said first intermediate composition to provide a second intermediate composition, at least part of said second hydrocarbon fluid remaining in said second intermediate composition; and
  (3) contacting said second intermediate composition from step (2) with a third hydrocarbon fluid of from 2 to about 4 carbon atoms for an effective period of time to extract at least part of said second hydrocarbon fluid from said second intermediate composition and form a third separatable phase comprising said second hydrocarbon fluid and said third hydrocarbon fluid, and separating at least part of said third separatable phase from said second intermediate composition to provide a treated product.

57. A process for separating hydrocarbon oil and heavy residual organics from a feed composition comprising solids intermixed with said hydrocarbon oil and heavy residual organics, said heavy residual organics having higher boiling points than said hydrocarbon oil, said process comprising the steps of:
  (1) contacting said feed composition with a first hydrocarbon fluid comprising propane for an effective period of time to extract at least part of said hydrocarbon oil from said feed composition and form a first separatable phase comprising said hydrocarbon oil and said first hydrocarbon fluid, and separating at least part of said first separatable phase from said feed composition to provide a first intermediate composition;
  (2) contacting said first intermediate composition from step (1) with a second hydrocarbon fluid for an effective period of time to extract at least part of said heavy residual organics from said first intermediate composition and form a second separatable phase comprising said second hydrocarbon fluid and said heavy residual organics, said second hydrocarbon fluid comprising benzene, toluene, o-xylene, m-xylene, p-xylene or a mixture of two or more thereof, and separating at least part of said second separatable phase from said first intermediate composition to provide a second intermediate composition, at least part of said second hydrocarbon fluid remaining in said second intermediate composition; and (3) contacting said second intermediate composition from step (2) with a third hydrocarbon fluid comprising propane for an effective period of time to extract at least part of said second hydrocarbon fluid from said second intermediate composition and form a third separatable phase comprising said second hydrocarbon fluid and said third hydrocarbon fluid, and separating at least part of said third separatable phase from said second intermediate composition to provide a treated product.

* * * * *